A. E. CHURCH.
CHUCK.
APPLICATION FILED NOV. 14, 1918.
1,315,467.
Patented Sept. 9, 1919.
2 SHEETS—SHEET 1.
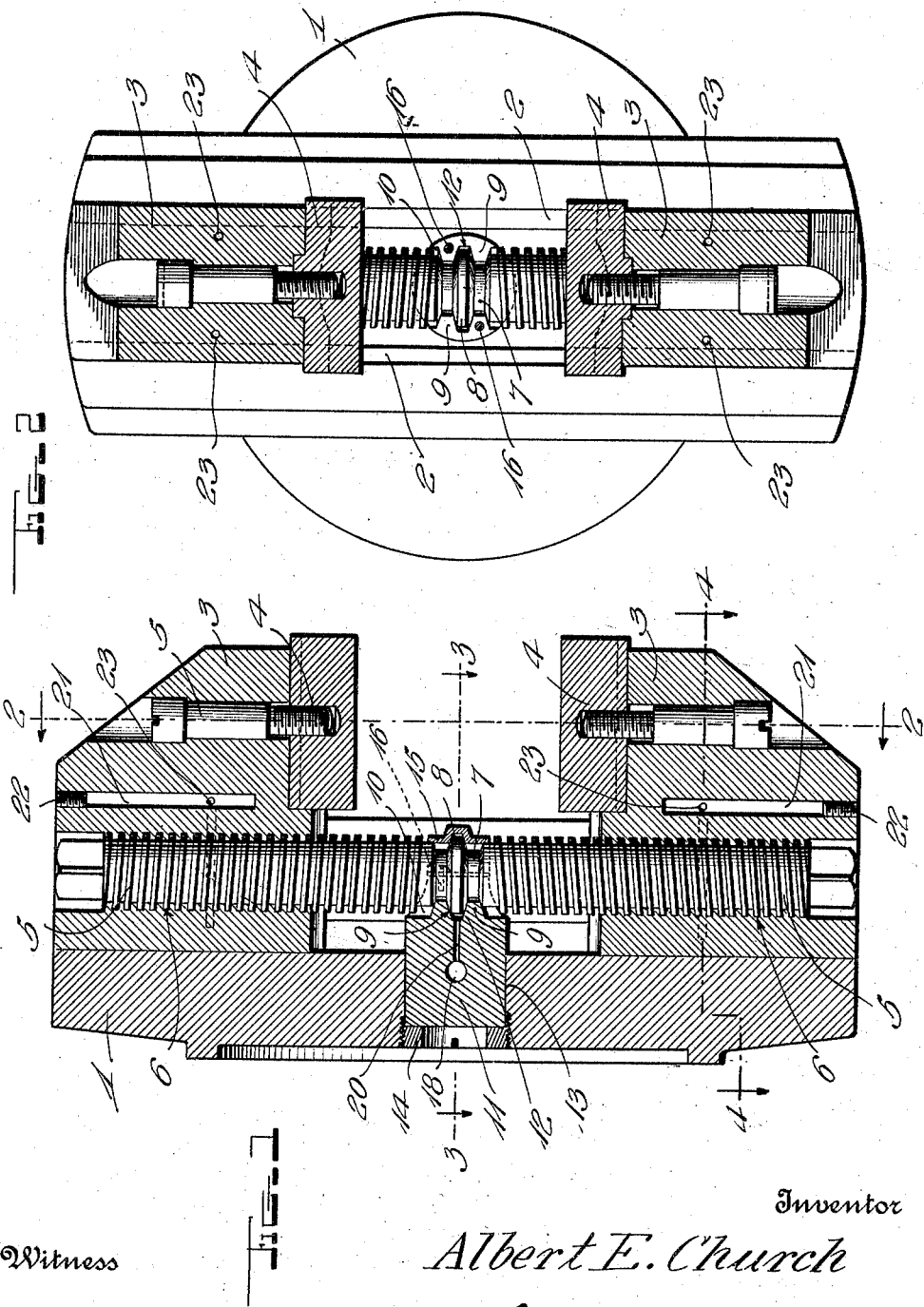
Inventor
Albert E. Church
By H. B. Willson &co.
Attorneys
Witness A. E. CHURCH.
CHUCK.
APPLICATION FILED NOV. 14, 1918.
1,315,467.
Patented Sept. 9, 1919.
2 SHEETS—SHEET 2.
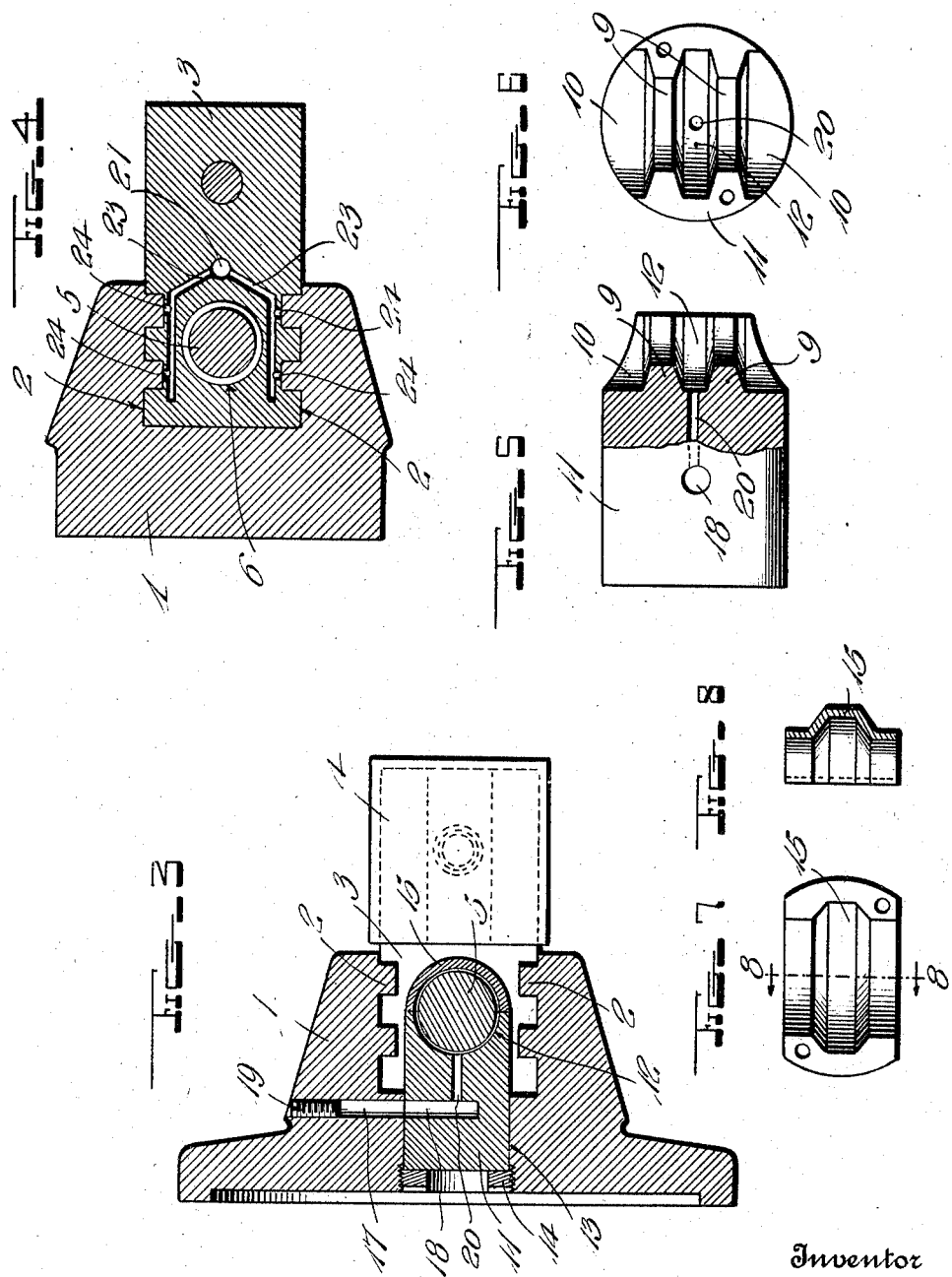

UNITED STATES PATENT OFFICE.

ALBERT E. CHURCH, OF NEW BRITAIN, CONNECTICUT.

CHUCK.

1,315,467. Specification of Letters Patent. Patented Sept. 9, 1919.

Application filed November 14, 1918. Serial No. 262,561.

*To all whom it may concern:*

Be it known that I, ALBERT E. CHURCH, a citizen of the United States, residing at New Britain, in the county of Hartford and State of Connecticut, have invented certain new and useful Improvements in Chucks; and I do declare the following to be a full, clear, and exact description of the invention, such as will enable others skilled in the art to which it appertains to make and use the same.

My invention relates to improvements in machinists' chucks and more particularly to those of the two-jawed type, the principal object being to provide a novel form of bearing for receiving all thrusts of the jaw adjusting screw and itself adjustable to take up wear, while another object is the provision of effective lubricating means.

With the foregoing in view, the invention resides in the novel features of construction, and unique association of parts hereinafter fully described and claimed, reference being made to the accompanying drawings.

Figure 1 is a longitudinal section of a chuck embodying my invention.

Fig. 2 is a transverse section on the plane indicated by the line 2—2 of Fig. 1.

Fig. 3 is a horizontal section on the plane of the line 3—3 of Fig. 1, showing more particularly the lubricating means for the thrust bearing.

Fig. 4 is an additional horizontal section as indicated by the line 4—4 of Fig. 1 and disclosing the lubricating means for the sliding jaws.

Fig. 5 is a side elevation partly in section of the thrust bearing.

Fig. 6 is an end elevation of the thrust bearing.

Fig. 7 is an inner side view of the dust cap of the thrust bearing.

Fig. 8 is a sectional view on the plane of the line 8—8 of Fig. 7.

In the drawings above briefly described, the numeral 1 designates a suitable chuck head having a guideway 2 in which a pair of jaws 3 are slidably mounted, said jaws being of any preferred construction and preferably having hardened metal work grips 4. An adjusting screw 5 is provided for the two jaws 3, and in order to locate this screw as near to the work gripping points as possible, the jaws are preferably provided with threaded bores 6 receiving the ends of the screw. It will be understood however that any of the other well known forms of construction for securing a threaded engagement between the adjusting screw and jaws could well be used.

At its center, the screw 5 is reduced in diameter at 7 and the central portion of such reduced part is provided with a circumferential rib 8, the opposite sides of this rib being beveled as shown to form thrust shoulders, as is also the metal at the juncture of the reduced portion 7 with the true diameter of the screw 5. The reduced portion of the screw forms in effect a pair of annular grooves on opposite sides of the rib 8 and these grooves receive arcuate ribs 9 in the centrally semi-cylindrical seat 10 of a central bearing block 11. Between the ribs 9, a groove 12 is formed and this groove snugly receives the rib 8 as most clearly illustrated in Figs. 1 and 2. The bearing block 11 is preferably cylindrical and is slidably received in a bore or guide opening 13, the latter being herein shown as formed at the axis of the head 1, although in some types of chucks, it might be otherwise located, according to the location of the adjusting screw. The bearing block 11 receives all thrusts of the screw 5 and in order that said bearing block may be adjusted transversely of the screw to take up wear, both on the screw threads and on the contacting surfaces of the screw and block, a plug 14 is threaded in the outer end of the bore or guide opening 13; and if desired or found necessary, any preferred means may be employed for locking the plug against accidental rotation.

Preferably used in connection with the features above described, is a substantially semi-circular dust cap 15 which, together with the seat 10, forms a complete cylindrical bearing for the central portion of the screw 5, said dust cap being secured to the bearing block 11 by screws or the like 16. It is rather important to provide such a dust cap, since provision is made for lubricating the contacting surfaces of the bearing block and screw and it is highly desirable to exclude dust, grit and the like which would impair the smooth operation of parts.

In lubricating as above set forth, the head 1 and block 11 are provided with registering bores 17 and 18 forming an oil well closed at its outer end by a plug or the like 19; and a port 20 leads from the oil well to the groove 12 of the seat 10. By this arrangement, it will be obvious that the required lubrication may be had at all times and it will be observed that sufficient space exists between the rib 8 and the bottom of the channel 12, and also between said rib and the corresponding channel of the cap 15, to permit a film of oil to surround the rib at all times, it being upon this rib that the greater part of the thrust from the screw 5 is received. It is also to be noted that the bores 17 and 18 are of such diameter as to allow maximum adjustment of the bearing block 11 without in any manner preventing the flow of oil from one bore into the other.

Another feature which I by preference employ, is lubricating means for oiling the guideway 2 as the jaws 3 slide along the same, and to this end I provide each of said jaws with simple lubricating wells and ports as will be clear from Figs. 1 and 4. The wells are formed by bores 21 in the jaws 3, said bores being closed at their outer ends by plugs or the like 22. From these bores or wells, ports 23 lead to the sides of the jaws, and are formed with branches 24 for supplying the oil to the sides of the guideway 2 as the jaws 3 are longitudinally adjusted therein.

By constructing the chuck as or substantially as shown and described, it will be highly efficient and in every way desirable for numerous kinds of work, particular attention being laid upon the novel thrust and adjusting bearing for the center of the screw; and it may be pointed out that this bearing need not assume the exact shape and construction shown and described.

Since probably the best results are obtained from the details shown and described, they may well be followed, but within the scope of the invention as claimed, considerable latitude is allowed for making such minor changes as occasion may dictate. Also, it will be clear that the invention is not restricted to chucks having only two jaws.

I claim:

1. In a chuck, a head, a pair of opposed jaws carried by said head, a screw having threaded engagement with said jaws for adjusting them as required, a non-yielding bearing mounted in said head and operatively associated with the center of said screw to receive all thrusts of the latter, and means for adjusting said bearing transversely of the screw and rigidly holding it in adjusted position to compensate for wear.

2. In a chuck, a head, a pair of opposed jaws carried by said head, a screw having threaded engagement with said jaws for adjusting them as required, said screw having a circumferentially shouldered center and said head having a guide opening adjacent said center, a bearing block received slidably in said guide opening and having a seat at its outer end bearing against said shouldered screw center and itself shouldered for coaction therewith in receiving all thrusts of the screw, and an adjusting plug threaded into said guide opening and contacting with the inner end of said bearing block for thrusting the latter transversely toward the screw to compensate for wear.

3. In a chuck, a head, a pair of jaws mounted on said head, a screw having threaded engagement with said jaws for adjusting them as required, a thrust bearing for the center of said screw, consisting of a block having a seat in one end snugly receiving the screw center, said head having a guide opening in which said block is adjustably mounted, said head and block having registering bores forming an oil well and said block having a port leading from said well to said seat, and a closure for the outer end of said oil well.

4. In a chuck, a head, a pair of opposed jaws carried by said head, a screw having threaded engagement with said jaws for adjusting them as required, said screw having a circumferentially shouldered center and said head having a guide opening adjacent said center, a bearing block received slidably in said guide opening and having a seat at its outer end bearing against said shouldered screw center for coaction therewith in receiving all thrusts of the screw, and adjusting means in the inner end of said guide opening and abutting the inner end of said bearing block for positively adjusting the latter transversely toward the screw to compensate for wear.

In testimony whereof I have hereunto set my hand.

ALBERT E. CHURCH.

Copies of this patent may be obtained for five cents each, by addressing the "Commissioner of Patents, Washington, D. C."